United States Patent
Jin et al.

(10) Patent No.: US 11,193,367 B2
(45) Date of Patent: Dec. 7, 2021

(54) LOW FREQUENCY DAS WELL INTERFERENCE EVALUATION

(71) Applicant: CONOCOPHILLIPS COMPANY, Houston, TX (US)

(72) Inventors: Ge Jin, Houston, TX (US); Kyle R Krueger, Houston, TX (US); Baishali Roy, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 226 days.

(21) Appl. No.: 16/365,173

(22) Filed: Mar. 26, 2019

(65) Prior Publication Data

US 2019/0301276 A1    Oct. 3, 2019

Related U.S. Application Data

(60) Provisional application No. 62/649,346, filed on Mar. 28, 2018.

(51) Int. Cl.
  *E21B 47/107*    (2012.01)
  *E21B 47/06*    (2012.01)
  (Continued)

(52) U.S. Cl.
  CPC ............ *E21B 47/107* (2020.05); *E21B 47/06* (2013.01); *E21B 47/07* (2020.05); *E21B 43/26* (2013.01);
  (Continued)

(58) Field of Classification Search
  CPC ........ E21B 47/06; E21B 47/07; E21B 47/107; E21B 43/26; G01V 2210/646; G01V 1/42
  See application file for complete search history.

(56) References Cited

U.S. PATENT DOCUMENTS 3,981,187 A   9/1976 Howell
4,676,664 A   6/1987 Anderson et al.
(Continued)

FOREIGN PATENT DOCUMENTS

GB    2492802 A    1/2013
WO    2001048353 A1    7/2001
(Continued)

OTHER PUBLICATIONS

International Search Report with Written Opinion for International Application No. PCT/US2018/031404 dated Jul. 13, 2018, pp. 15.
(Continued)

*Primary Examiner* — Robert E Fuller
*Assistant Examiner* — Lamia Quaim
(74) *Attorney, Agent, or Firm* — Boulware & Valoir

(57) ABSTRACT

A method of assessing cross-well interference and/or optimizing hydrocarbon production from a reservoir by obtaining low frequency DAS and DTS data and pressure data from a monitor well, when both the monitor and production well are shut-in, and then variably opening the production well for production, and detecting the temperature and pressure fluctuations that indication cross-well interference, and localizing the interference along the well length based on the low frequency DAS data. This information can be used to optimize well placement, completion plans, fracturing plans, and ultimately optimize production from a given reservoir.

19 Claims, 11 Drawing Sheets

(51) Int. Cl.
  *E21B 47/07* (2012.01)
  *E21B 43/26* (2006.01)
  *G01V 1/42* (2006.01)
  *G01H 9/00* (2006.01)
  *E21B 47/135* (2012.01)
(52) U.S. Cl.
  CPC ............ *E21B 47/135* (2020.05); *G01H 9/004* (2013.01); *G01V 1/42* (2013.01); *G01V 2210/646* (2013.01)

(56) References Cited

U.S. PATENT DOCUMENTS

| | | |
|---|---|---|
| 6,026,913 A | 2/2000 | Mandal et al. |
| 6,072,567 A | 6/2000 | Sapack |
| 6,176,323 B1 | 1/2001 | Weirich et al. |
| 6,268,911 B1 | 7/2001 | Tubel et al. |
| 6,778,720 B1 | 8/2004 | Cekorich et al. |
| 7,055,604 B2 | 6/2006 | Jee et al. |
| 7,072,044 B2 | 7/2006 | Kringlebotn |
| 7,668,411 B2 | 2/2010 | Davies et al. |
| 8,505,625 B2 | 8/2013 | Ravi et al. |
| 8,630,816 B2 | 1/2014 | Park et al. |
| 8,646,968 B2 | 2/2014 | MacDougall et al. |
| 8,930,143 B2 | 1/2015 | Sierra et al. |
| 8,950,482 B2 | 2/2015 | Hill et al. |
| 9,116,119 B2 | 8/2015 | Le Floch |
| 9,273,548 B2 | 3/2016 | LeBlanc et al. |
| 9,347,310 B2 | 5/2016 | Unalmis et al. |
| 9,416,644 B2 | 8/2016 | McEwen-King et al. |
| 9,464,512 B2 | 10/2016 | Kalia et al. |
| 10,095,828 B2 | 10/2018 | Swan et al. |
| 2002/0180728 A1 | 12/2002 | Neff et al. |
| 2003/0205375 A1 | 11/2003 | Wright et al. |
| 2006/0272809 A1 | 12/2006 | Tubel et al. |
| 2008/0277568 A1 | 11/2008 | Crickmore et al. |
| 2009/0114386 A1 | 5/2009 | Hartog et al. |
| 2009/0194333 A1 | 8/2009 | MacDonald |
| 2009/0326826 A1 | 12/2009 | Hull et al. |
| 2010/0076738 A1 | 3/2010 | Dean et al. |
| 2010/0200743 A1 | 8/2010 | Forster et al. |
| 2010/0200744 A1 | 8/2010 | Pearce et al. |
| 2010/0284250 A1 | 11/2010 | Cornish et al. |
| 2011/0019178 A1 | 1/2011 | Vlatas |
| 2011/0188347 A1 | 8/2011 | Thiercelin et al. |
| 2011/0288843 A1 | 11/2011 | Weng et al. |
| 2012/0017687 A1 | 1/2012 | Davis et al. |
| 2012/0057432 A1 | 3/2012 | Hill et al. |
| 2012/0067118 A1 | 3/2012 | Hartog et al. |
| 2012/0092960 A1 | 4/2012 | Gaston et al. |
| 2012/0133367 A1 | 5/2012 | Bittar et al. |
| 2012/0147924 A1 | 6/2012 | Hall |
| 2013/0023353 A1 | 1/2013 | Wright |
| 2013/0032338 A1 | 2/2013 | Kalia |
| 2013/0211726 A1 | 8/2013 | Mestayer et al. |
| 2013/0298635 A1 | 11/2013 | Godfrey |
| 2013/0298665 A1 | 11/2013 | Minchau |
| 2014/0036628 A1 | 2/2014 | Hill et al. |
| 2014/0100274 A1 | 4/2014 | Bobotas et al. |
| 2014/0110124 A1 | 4/2014 | Goldner et al. |
| 2014/0126325 A1 | 5/2014 | Farhadiroushan et al. |
| 2014/0163889 A1 | 6/2014 | Finfer et al. |
| 2014/0180592 A1 | 6/2014 | Ravi et al. |
| 2014/0202240 A1 | 7/2014 | Skinner et al. |
| 2014/0216151 A1 | 8/2014 | Godfrey |
| 2014/0246191 A1 | 9/2014 | Zolezzi-Garreton |
| 2014/0260588 A1 | 9/2014 | Jaaskelainen et al. |
| 2014/0290936 A1 | 10/2014 | Wills et al. |
| 2014/0358444 A1 | 12/2014 | Friehauf et al. |
| 2014/0365130 A1 | 12/2014 | Woods |
| 2015/0000932 A1 | 1/2015 | O'Brien |
| 2015/0014521 A1 | 1/2015 | Barfoot |
| 2015/0057934 A1 | 2/2015 | Ma et al. |
| 2015/0083405 A1* | 3/2015 | Dobroskok ............ E21B 43/26 166/250.1 |
| 2015/0135819 A1 | 5/2015 | Petrella et al. |
| 2015/0146759 A1 | 5/2015 | Johnston |
| 2015/0159478 A1 | 6/2015 | Georgi et al. |
| 2015/0331971 A1 | 11/2015 | Scollard et al. |
| 2016/0003032 A1 | 1/2016 | Grubb et al. |
| 2016/0138389 A1 | 5/2016 | Stokely |
| 2016/0146962 A1 | 5/2016 | Hayward |
| 2016/0265345 A1 | 9/2016 | In't Panhuis et al. |
| 2016/0266276 A1 | 9/2016 | Stokely et al. |
| 2016/0356125 A1 | 12/2016 | Bello |
| 2017/0045410 A1 | 2/2017 | Crickmore et al. |
| 2017/0075005 A1 | 3/2017 | Ranjan et al. |
| 2017/0075006 A1 | 3/2017 | Dusterhoft et al. |
| 2017/0191363 A1 | 7/2017 | Dickenson |
| 2017/0205260 A1 | 7/2017 | Jaaskelainen et al. |
| 2017/0260839 A1 | 9/2017 | Beardmore et al. |
| 2017/0260842 A1 | 9/2017 | Jin et al. |
| 2017/0260846 A1 | 9/2017 | Jin et al. |
| 2017/0260849 A1 | 9/2017 | Jin et al. |
| 2017/0260854 A1 | 9/2017 | Jin et al. |
| 2017/0328181 A1 | 11/2017 | Kristjansson |
| 2017/0342814 A1 | 11/2017 | Krueger et al. |
| 2018/0016890 A1 | 1/2018 | Friehauf |
| 2018/0045040 A1 | 2/2018 | Swan et al. |
| 2018/0217285 A1 | 8/2018 | Walters et al. |
| 2018/0230049 A1 | 8/2018 | Wysocki et al. |
| 2018/0348389 A1 | 12/2018 | Jaaskelainen et al. |

FOREIGN PATENT DOCUMENTS

| | | |
|---|---|---|
| WO | 2013092906 A2 | 6/2013 |
| WO | 2014201316 A1 | 12/2014 |
| WO | 2015065869 A1 | 5/2015 |
| WO | 2015076976 A1 | 5/2015 |
| WO | 2015094180 A1 | 6/2015 |
| WO | 2015107332 A1 | 7/2015 |
| WO | 2015170113 A1 | 11/2015 |
| WO | 2015187140 A1 | 12/2015 |
| WO | 2015187149 A1 | 12/2015 |
| WO | 2016007161 A1 | 1/2016 |
| WO | 2016069322 A1 | 5/2016 |
| WO | 2017027340 A1 | 2/2017 |
| WO | 2017039605 A1 | 3/2017 |
| WO | 2017156339 A1 | 9/2017 |
| WO | 2018204920 A1 | 11/2018 |

OTHER PUBLICATIONS

International Search Report with Written Opinion for International Application No. PCT/US2018/056327 dated Dec. 21, 2018, pp. 12.
European Search Report for European Application No. EP18794756.9 dated Apr. 14, 2020.
Rector, J.W., et al—"The Use of an Active Drill Bit for Inverse VSP Measurements", 2018, Exploration Geophysics, vol. 20, Issue 1-2, Abstract only, 5 pgs.
URTEC-2670034-MS (2017) Raterman K.Y., et al., Sampling a Stimulated Rock Volume: An Eagle Ford Example.
SPE-168610-MS (2014)—Holley, E.H., et al. "Using Distributed Optical Sensing to Constrain Fracture Models andConfirm Reservoir Coverage in Permian Basin."SPE Hydraulic Fracturing Technology Conference, The Woodlands, Texas, U.S.A., Feb. 4-6.
SPE-153131-PA (2013)—Holley, E.H., et al., "Interpreting Uncemented Multistage Hydraulic-Fracturing Completion Effectiveness By Use of Fiber-Optic DTS Injection Data." SPE Drilling & Completion, 28(3): 243-253.
SPE-107775-PA (2009)—Glasbergen G., et al. "Real-Time Fluid Distribution Determination in Matrix TreatmentsUsing DTS", Society of Petroleum Engineers.
SPE-116182-MS (2008)—Sierra J.R., et al., "DTS Monitoring of Hydraulic Fracturing: Experiences and Lessonearned", Society of Petroleum Engineers.
SPE-107854-MS (2007)—Tardy, et al., "An Experimentally Validated Wormhole Model for Self-Diverting and: Conventional Acids in Carbonate Rocks Under Radial Flow Conditions", Society of Petroleum Engineers.

(56) References Cited

OTHER PUBLICATIONS

Ribeiro et al., Detecting Fracture Growth Out of Zone Using Temperature Analysis, Oct. 27-29, 2014, SPE-1707 46-MS, SPE Annual Technical Conference and Exhibition, Amsterdam, The Netherlands, 24 pp. (Year: 2014).

Hesthammer, J et al. "From seismic data to core data: an integrated approach to enhancereservoir characterization"; 2003; Geological Society, London, Special Publications, 209, pp. 39-54.

Awada, A., et al. "Is that interference? A work flow for identifying and analyzing communication through hydraulic fractures in a multiwell pad," SPE Journal, vol. 21, No. 5, pp. 13 (Oct. 2016).

Becker, M.B., et al., "Measuring Hydralic Connection in Fractured Bedrock with Periodic Hydraulic Tests and Distributed Acoustic Sensing," Juounal of Hydrology, pp. 1-11 (Feb. 22-24, 2016).

Boman, K., "DAS technology expands fiber optic applications for oil, gas industry," Rigzone, (May 4, 2015) issue : http://www.rigzone.com/news/oil_gas/a/138405/DAS_Technology_Expands_Fiber_Optic_Applications_for Oil_Gas_Industry, pp. 4.

Boone, K., et al., "Monitoring Hydraulic Fracturing Operations Using Fiber-Optic Distributed Acoustic Sensing," Unconventional Resources Technology Conference, pp. 8 (2015).

European Search Report for European Application No. EP 17764137.0 dated Mar. 6, 2019.

European Search Report for European Application No. EP 17764143.8 dated Mar. 4, 2019.

European Search Report for European Application No. EP 17764150.3 dated Mar. 4, 2019.

European Search Report for European Application No. EP 17764151.1 dated Mar. 4, 2019.

European Search Report for European Application No. EP17764146.1 dated Mar. 14, 2019.

Grayson, S., et al., "Monitoring acid stimulation treatments in naturally fractured reservoirs with slickline distributed temperature sensing," Society of Petroleum Engineers, pp. 17, (Jan. 2015).

International Search Report with Written Opinion for International Application No. PCT/US2017/021659 dated Jun. 1, 2017, pp. 7.

International Search Report with written opinion dated Jun. 1, 2017 for International Application No. PCT/US2017/021667, pp. 8.

International Search Report with Written Opinion for International Application No. PCT/US2017/021674 dated May 25, 2017, pp. 10.

International Search Report with Written Opinion for International Application No. PCT/US2017/021678 dated Jun. 1, 2017, pp. 7.

International Search Report with Written Opinion for International Application No. PCT/US2017/021679 dated May 25, 2017, pp. 7.

International Search Report with Written Opinion for International Application No. PCT/US2017/021681 dated May 22, 2017, pp. 10.

International Search Report with Written Opinion for International Application No. PCT/US2017/21670 dated May 25, 2017, pp. 6.

Jin, G., and Roy, B., "Hydraulic-fracture geometry characterization using low-frequency DAS signal," The Leading Edge, vol. 36, No. 12, pp. 962-1044 (Dec. 2017).

Johannessen, K., et al. "Distributed Acoustic Sensing—a new way of listening to your well/reservoir," Society of Petroleum Engineers, Society of Petroleum Engineers, pp. 1-9 (Mar. 27-29, 2012).

Le Calvez, J. H., et al. "Real-time microseismic monitoring of hydraulic fracture treatment: a tool to improve completion and reservoir management," Society of Petroleum Engineers, pp. 7 (Jan. 2007).

Lord, D.L., "Study of Performation Friction Pressure Employing a Loarge-Scale Fracturing Flow Simulator," SPE Annual technical Conference and Exhibition, pp. 10 (Sep. 25, 1994).

McKinley, R.M., et al., "Specialized Applications of Noise Logging," Journal of Petroleum Technology, vol. 31, Issue 11, pp. 1387-1395 (Nov. 1979).

McKinley, R.M., et al., "The Structure and Interpretation of Noise From Flow Behind Cemented Casing," Journal of Petroleum Technology, vol. 25, No. 3, pp. 329-338 (Mar. 1973).

Molenaar, M., et al, "First Downhole Application of Distributed Acoustic Sensing (DAS) for Hydraulic Fracturing Monitoring and Diagnostics," Society of Petroleum Engineers, vol. 27, No. 1, pp. 32-38 (Mar. 2012).

Molenaar, M.M., et al., "Real-Time Downhole Monitoring of Hydraulic Fracturing Treatments Using Fibre Optic Distributed Temperature and Acoustic Sensing," Society of Petroleum Engineers, pp. 13 (2012).

Optasense, "Pipeline Integrity Management: Leak Detection," accessed at https://ace-control.com.sg/wp-content/uploads/2018/11/Pipeline-Integrity-Management-Leak-Detection.pdf, accessed on Jun. 10, 2019, pp. 5.

Ouyang, L-B., et al. "Flow profiling via distributed temperature sensor (DTS) system-expectation and reality," Society of Petroleum Engineers, pp. 14 (2004).

Paleja, R, et al., "Velocity Tracking for Flow Monitoring and Production Profiling Using Distributed Acoustic Sensing," Society of Petroleum Engineers, pp. 16 (Sep. 28-30, 2015).

Portis, D. H., et al., "Searching for the optimal well spacing in the eagle ford shale: A practical tool-kit," Unconventional Resources Technology Conference, pp. 8 (Aug. 12-14, 2013).

Sellwood S.M., et al., "An in-well heat-tracer-test method for evaluating borehole flow conditions," Hydrogeology Journal, Springer, vol. 23, No. 8, pp. 1817-1830 (Aug. 29, 2015).

Webster, P., et al. "Micro-Seismic detection using distributed acoustic sensing," society of Exploration Geophysicists, pp. 5 (Aug. 19, 2013).

Webster, P., et al., "Developments in Diagnostic Tools for Hydraulic Fracture Geometry Analysis," Unconventional Resources Technology Conference, pp. 7 (Aug. 12-14, 2013).

Wheaton, B., et al. "A case study of completion effectiveness in the eagle ford shale using DAS/DTS observations and hydraulic fracture modeling," Society of Petroleum Engineers, pp. 11 (2016).

Wu, K., et al. "Mechanism analysis of well interference in unconventional reservoirs: Insights from fracture-geometry simulation between two horizontal wells," Society of Petroleum Engineers, vol. 33, No. 1, pp. 9 (Feb. 2018).

International Search Report for International Application No. PCT/US2019/0024087 dated Jun. 19, 2019.

Sheather, S. J., et al., A Reliable Data-Based Bandwidth Selection Method for Kernel Density Estimation, Journal of the Royal Statistical Society. Series B (Methodological), vol. 53, Issue 3 (1991), 683-690.

Silverman, B. W., Density Estimation for Statistics and Data Analysis, School of Mathematics University of Bath, UK, Monographs on Statistics and Applied Probability, London: Chapman and Hall, 1986, 22 pp.

Vu-Hoang, D., et al., A Novel Approach To Production Logging in Multiphase Horizontal Wells, Society of Petroleum Engineers, Inc. SPE-89848, 2004, 11 pp.

Bukhamsin, Ahmed, et al., Cointerpretation of Distributed Acoustic and Temperature Sensing for Improved Smart Well Inflow Profiling, Society of Petroleum Engineers 2016, SPE-180465-MS, 17 pp.

Byrd, Richard H., et al., A Limited Memory Algorithm for Bound Constrained Optimization, Society of Industrial and Applied Mathematics, vol. 16, No. 5, pp. 1190-1208, Sep. 1995.

Dakin, J. P., et al., Distributed Optical Fibre Raman Temperature Sensor Using a Semiconductor Light Source and Detector, Electronics Letters, Jun. 20, 1985, vol. 21, No. 13, pp. 569-570.

Curtis, M. R., et al., Use of Temperature Log For Determining Flow Rates in Producing Wells, Society of Petroleum Engineers of AIME, SPE-4637,1973 12 pp.

Ramey, H. J., Wellbore Heat Transmission, Society of Petroleum Engineers SPE-96, Journal of Petroleum Technology 1962, pp. 427-435.

Van der Horst, J., et al.. Fiber Optic Sensing for Improved Wellbore Production Surveillance, International Petroleum Technology Conference IPTC 17528, Jan. 2014, 7 pp.

\* cited by examiner

LOW FREQUENCY DAS WELL INTERFERENCE EVALUATION

PRIOR RELATED APPLICATIONS

This application claims priority to U.S. Ser. No. 62/649,346, filed Mar. 28, 2018, and incorporated by reference in its entirety for all purposes.

FIELD OF THE DISCLOSURE

The disclosure relates generally to methods of assessing cross well interference using Distributed Temperature Sensing (DTS), Distributed Acoustic Sensing (DAS), and pressure data.

BACKGROUND OF THE DISCLOSURE

Unconventional reservoirs include reservoirs such as tight-gas sands, gas and oil shales, coalbed methane, heavy oil and tar sands, and gas-hydrate deposits. These reservoirs have little to no porosity, thus the hydrocarbons may be trapped within fractures and pore spaces of the formation. Additionally, the hydrocarbons may be adsorbed onto organic material of a e.g. shale formation. Therefore, such reservoirs require special recovery operations beyond the conventional operating practices in order to mobilize and produce the oil.

The rapid development of extracting hydrocarbons from these unconventional reservoirs can be tied to the combination of horizontal drilling and induced fracturing (called "hydraulic fracturing" or simply "fracking") of the formations. Horizontal drilling has allowed for drilling along and within hydrocarbon reservoirs of a formation to better capture the hydrocarbons trapped within the reservoirs. Additionally, increasing the number of fractures in the formation and/or increasing the size of existing fractures through fracking further increases hydrocarbon recovery.

In a typical hydraulic fracturing treatment, fracturing treatment fluid is pumped downhole into the formation at a pressure sufficiently high enough to cause new fractures or to enlarge existing fractures in the reservoir. Next, frack fluid plus a proppant, such as sand, is pumped downhole. The proppant material remains in the fracture after the treatment is completed, where it serves to hold the fracture open, thereby enhancing the ability of fluids to migrate from the formation to the well bore through the fracture. The spacing between fractures as well as the ability to stimulate fractures naturally present in the rock may be major factors in the success of horizontal completions in unconventional hydrocarbon reservoirs.

While there are a great many fracking techniques, one useful technique is "plug-and-perf" fracking. Plug-and-perf completions are extremely flexible multistage well completion techniques for cased hole wells. Each stage can be perforated and treated optimally because the fracture plan options can be modified in each stage. The engineer can apply knowledge from each previous stage to optimize treatment of the current frack stage.

The process consists of pumping a plug-and-perforating gun to a given depth. The plug is set, the zone perforated, and the tools removed from the well. A ball is pumped downhole to isolate the zones below the plug and the fracture stimulation treatment is then pumped in, although washing, etching, and other treatments may occur first depending on downhole conditions. The ball-activated plug diverts fracture fluids through the perforations into the formation, where pressure build-up and eventually causes fracturing. The fractures are held open by the subsequent delivery of frack fluid plus a proppant—the small grains of sand "propping" the fractures open. After the fracture stage is completed, the next plug and set of perforations are initiated, and the process is repeated moving further up the well.

One undesirable result of a fracking program occurs when the fractures of one well reach to the fractures of a nearby well, causing interference. Well interference has become an ever-increasing problem as the spacing between wells has significantly decreased in recent years. Understanding the characteristics of well interference provides important insights for well spacing and completion design decisions.

Many methods have been developed to detect and analyze well interference, which includes: pressure monitoring, chemical/radioactive tracers, microseismic monitoring during stimulation, etc. However, all these methods have limitations. For example, pressure analysis examines the pressure communication between the wells, but provides no spatial information about the connectivity. Tracers can provide spatial information, but both chemical and radioactive tracers can only measure well interference during early production stages because of limited downhole survival time. Microseismic surveys can only provide qualitative interpretations of the reservoir and the fractures, since there is no physical model that directly correlates microseismicity with fracture connectivity.

Distributed Acoustic Sensing (DAS) is an emerging fiber optic based technology that has become available for the oil industry only in recent years. The method requires an optical fiber attached to the wellbore to guide the laser energy into the reservoir. Each piece of the fiber naturally scatters a small portion of the laser energy back to the surface sensing unit. The sensing unit then uses interferometry techniques to measure the strain change along the fiber. The DAS data are usually sampled at a very high rate (5000-10000 Hz) with a spatial resolution between 1-10 m. This high position accuracy provides critical spatial data for detecting near well bore changes both in the well undergoing stimulation and in an offset monitor well.

The raw DAS data are usually delivered in the form of optical phase, which ranges from $-\pi$ to $+\pi$. The optical phase is defined by the interference pattern of the laser energy back-scattered at two fiber locations separated by a certain length. The separation length is usually referred as gauge length. The phase varies linearly with small length change between two locations, which can be approximated as the axial strain change of the fiber between the locations. Depending on the sensing unit provider, the data deliverable is sometimes a time differential of the measured optical phase. In this case, the DAS data can be treated as a linear-scaled strain rate.

DAS data have been used to monitor hydraulic fracturing operations in many studies. The applications include injection fluid allocation, hydraulic fracture detection, microseismic monitoring, and others. However, most of these applications focus on the high frequency bands (>1 Hz) of the DAS data, and some applications only use the "intensity" of the signal, which is obtained through amplitude averaging processing. In this study, we demonstrate that DAS data in the low-frequency band (<1 Hz, preferably <0.1 Hz, or even <0.05 Hz) contain information that can provide critical information on cross well fluid communication.

Jin & Roy (2017) presented a novel method of using the low-frequency DAS signal to map fracture connections between nearby wells during completion. However, mapping fracture connections during completion cannot provide information of the connectivity during production of hydrocarbons. Thus, this early work by Jin & Roy needs to be further developed to allow evaluation of well interference during oil production.

Thus, what is still needed in the art is a method of evaluating cross well interference that includes spatial information along the wellbore. Even incremental improvements in technology can mean the difference between cost effective production and reserves that are uneconomical to produce.

SUMMARY OF THE DISCLOSURE

Herein we present a new method of assessing cross-well interference that uses fiber optical sensing technology to spatially locate and evaluate well interference. This method requires optical fibers to be installed along the wellbore, either through a permanent behind-casing installation, or through well intervention methods like wireline or coil tubing. Sensing units at the surface send laser pulses into the fiber and measure the reflected energy at each section of the fiber due to the glass impurities.

There are two fiber optical sensing techniques that are used in this method: Distributed Temperature Sensing (DTS) and Distributed Acoustic Sensing (DAS). DTS uses Raman scattering to measure absolute temperature along an optical fiber with around 1-ft spatial resolution and less than 1 F accuracy. The sample rate of a DTS system ranges from 1 s to several minutes.

DAS, by contrast, uses Rayleigh scattering to measure strain rate along the fiber. It usually has a spatial resolution around 1-10 meters, with a sample rate around 5-10 kHz. The measurement is sensitive to signals in a very broad frequency range. At a very low-frequency band (<1 Hz, preferably <0.1 HZ, most preferred >0 and <0.05 HZ), it is sensitive to the strain changes due to very small temperature perturbations. Thus, DAS can be used to measure temperature variation as small as $10^{-5}$ F/s. However, DAS cannot measure absolute temperature, making the temperature change relative in the downhole context. The low frequency band is also used because the resulting data contains polarity information.

By using the DAS low-frequency response, we can detect the small temperature perturbations induced by cross flows between the monitor well perforations due to well interference during the production of the operation well (FIG. 1). The connectivity between the wells can be quantitatively evaluated utilizing the DTS temperature gradient and the low-frequency DAS signal as recorded on the monitor well.

However, collecting low frequency DAS can create challenges in data analysis. For example, there is almost always spike noise present resulting from phase errors in the interrogator. In some applications, there is an extremely low-frequency (<1 mHz) drift signal that affects all channels of the DAS interrogator and can be of greater strength (e.g. intensity) than the signal of interest.

Installation issues can also lead to interference. If the fiber optic cable used in DAS sensing is not directly coupled to the borehole, as is the case for in temporary installations, there can be noise associated with vibrations in the fiber casing. The vibration noise can be orders of magnitude higher than the signal of interest, thus effectively masking the signals. In thermal sensing applications, significant thermal dissipation, depending on material properties between the fluid and the fiber itself, can be exhibited.

Depending on the DAS application, installation and material effects, all or some of these interferences can affect the data sensing and/or acquisition. This leads to inaccurate results, time-consuming delays in operation to gather additional data and/or extended analysis time by the operator, and costly mistakes.

Thus, a new DAS processing workflow was designed to accurately "denoise" low-frequency DAS data for analysis in varied environments and applications. The workflow determines which interferences or noise source is present, and applies one or more correction techniques to mitigate or remove the interferences and/or noise from the acquired data. This allows for selective modulation based on the characteristics present instead of a universal application of all techniques. In turn, the selective modulation reduces the time needed for correction of the acquisition data and speeds analysis. This methodology is described in US20170260854 Low-frequency DAS SNR improvement (expressly incorporated by reference in its entirety for all purposes), and can be employed herein.

The method generally proceeds as follows:

1. Select two hydraulically fractured wells suspected of well interference, and configure one as the monitor well and the other as the operation or production well.

2. Install fiber optic cable in the monitor well, unless already present. The installation can either be permanent, behind the casing, or through well intervention methods using e.g., wireline, coil tubing, or carbon rod.

3. Shut-in both wells for an extended period of time, to allow the temperature and pressures to equilibrate (about 6-72 hrs, preferably about 12-24 hrs).

4. Begin simultaneously recording DAS and DTS for about 1-5 hours, preferably about 2-3 hours.

5. Open the operation or production well for hydrocarbon recovery and continuously record DAS and DTS data throughout this step. Some choke size variation during the opening is recommended, as this will create a pressure signal pattern that is easier to recognize in the DAS data. Alternatively, choke size can be changed to open and close the well at a later time period.

6. Analyze the data recorded at the monitor well to evaluate any cross-well connections. Additional detail on how the data is analyzed is provided below.

7. The cross-well interference information is then used to optimized various well drilling, completion, fracturing, or production plans, and those optimized plans are ultimately used to produce hydrocarbons from those or nearby wells.

The two wells can also be switched to further confirm the results, as stronger cross-well interference should show up in roughly the same places along the wells.

The signal can be obtained in either vertical or horizontal wells, but the main application is expected to be for use in horizontal wells in unconventional reservoirs.

The preferred optical fibers are those capable of working in harsh environments. In harsh environments, like those found in oil and gas applications, molecular hydrogen will diffuse from the environment, through virtually all materials, and nest in the core of the optical fiber. This build-up of hydrogen causes attenuation to increase, is highly variable, and affected by temperature, pressure, and hydrogen concentration. Thus, fibers suitable for oil and gas applications are required. Exemplary fibers include the Ge-doped single mode and Pure-core single mode from OFS Optics; Downhole Fibers from FIBERCORE; FiberPoint Sensors from Halliburton, and OmniWell from Weatherford. Schlumberger also offers a heterodyne distributed vibration sensing system for DAS and Ziebel offers Z-ROD, an optical fiber inside a carbon rod.

The Rayleigh and Ramen scattering that travels through the fibers is collected by an interrogator connected to each fiber. It is also possible to use the same interrogator to monitor multiple fibers. Numerous interrogators are available to record optical signals including single laser, dual laser, multiple laser, PINNACLE™ Gen-1 and Phase-1 or Phase-2, HALLIBURTON FIBERWATCH™, PROXFMION™ FBG-Interrogator, NATIONAL INSTRUMENTS™ PXI, LUNA™, Silixa iDAS™, Optasense OPTASENSE®, Fotech Helios® or other interrogator.

In one embodiment, Pinnacle Gen-1 and Phase-2 interrogators are used for the recording the detected acoustic signals. In other embodiments, Silixa iDAS™ is used.

The interrogator collects the data in at least one data set. The raw data may be at more than 6000 locations (frequently referred to as "channels") with a variety of spatial separations from centimeters to meters along the fiber dependent upon length and required sensitivity. The gauge length may also be varied dependent upon fiber length and the interrogator used, from 1-100 meters, including 1, 5, 10, 25, 50, 75 and 100 meters. When recording, the measured optical phase is differentiated in time, so the raw DAS data is linearly associated with strain rate along the fiber. The low-pass filter does not affect these parameters. The gauge length and spatial spacing of the channels are determined by the signal-to-noise level and manufacturer of the interrogator.

In some cases two or more interrogators may be used in parallel, one to collect "noise"/high-frequency DAS and a second interrogator to collect temperature rate of change/low-frequency DAS.

The workflow as described in WO2017156339 (expressly incorporated by reference in its entirety for all purposes) entails: i) spike noise reduction with 2D median filtering; ii) low frequency drift is removed with either a joint inversion with DTS, or a time dependent drift from a "quiet" section of the DAS signal may be used to remove drift; iii) vibration noise is removed using velocity separability done with an FK-filter; iv) artifacts such as phase error impulse spikes may require an envelope soft limit be used to threshold high amplitude noise; v) for measurements outside the desired area temperature diffusion effect may be removed by thermal recoupling; vi) thermal loss, mixing, and interaction as one or more fluids travel through the wellbore may be approximated by dynamic fluid correction.

In another embodiment, the workflow provides a series of signal to noise ratio (SNR) reduction techniques for production: i) Obtain a "raw" LF-DAS signal; ii) If spike noise is present, perform 2D Median filtering; iii) If LF drift is present: a. If temperature based, remove with DAS/DTS Joint Inversion; or b. If it is not temperature based or if no DTS is available, remove with signal exclusion; iv) If fiber vibration noise is present, Envelope soft limit and FK-Filter; v) Thermal recouple; and vi) Provide signal for later analysis.

Once converted, the transformed dataset can be displayed in any data analysis software capable of displaying DAS data. Examples in the oil and gas industry include FiberView, SeisSpace® or STIMWATCH® from Halliburton, WellWatcher from Schlumberger. Other useful software that is not specific to the oil and gas industry include Matlab, Spotfire, Python, and Excel. Most software can be used to convert the data into a continuous record, transform the data, and down sample the data using pre-programmed operations. However, operations to perform these steps can be programmed if needed.

The displayed DAS signal or dataset can then be used as an interpretive tool to monitor well interference. In some scenarios, the data will inform the project manager interference with production allowing key decisions in field development including well spacing, treatment pressures, reservoir connectivity, and flow rates.

In some embodiments, the observed changes in the reservoir can be inputted into a reservoir modeling program to optimize the proposed drilling trajectories, completions, hydraulic fracturing methods, and production plans for a given reservoir or reservoirs similar in character to the reservoir being monitored. The optimized programs can then be implemented downhole and ultimately can then be used to produce oil or other hydrocarbon. The programs and methods described utilize non-transitory machine-readable storage medium, which when executed by at least one processor of a computer, performs the steps of the method(s) described herein.

Due to the nature of the data pre- and post-transform, parallel computing and data storage infrastructure created for data intensive projects, like seismic data processing, are used because they can easily handle the complete dataset. Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system. Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Alternatively, many-cores can be used in the computing. A Linux based multi-core cluster has been used to process the data in the examples described herein.

The disclosed methods include any one or more of the below embodiments in any combination(s) thereof:

A method of evaluating cross-well interference, comprising:

a) providing a hydraulically fractured monitor well and a hydraulically fractured production well, said monitor well and said production well in a hydrocarbon formation;

b) providing one or more fiber optic cables along a length of said monitor well, wherein said one or more fiber optic cables are configured for low frequency distributed acoustic sensing ("DAS") of <1 Hz and for distributed temperature sensing ("DTS");

c) shutting-in both wells until temperature and pressure equilibrates and then recording DAS data and DTS data for at least 2 hours in said monitor well;

d) opening said production well and producing hydrocarbon for a period of time and continuing recording DAS data and DTS data throughout said period of time;

e) analyzing said DAS data and said DTS data and determining whether said monitor well and said production well have interference based on temperature fluctuations detected in said DAS data; and f) identifying one or more locations where interference is occurring based on locations where said temperature fluctuations are detected.

A method of optimizing hydrocarbon production from a reservoir, comprising:

a) providing a hydraulically fractured monitor well and a hydraulically fractured production well in a reservoir, said monitor well and said production well having potential interference;

b) providing one or more fiber optic cables along a length of said monitor well, wherein said one or more fiber optic cables are configured for low frequency distributed acoustic sensing ("DAS") of <0.1 Hz and for distributed temperature sensing ("DTS");

c) shutting-in both wells for about 12 hours or more and then recording DAS data and DTS data and pressure data for at least 2 hours in said monitor well;

d) variably opening said production well to vary pressure over a period of time and continuing recording DAS data and DTS data and pressure data throughout said period of time;

e) analyzing said DAS data and said DTS data and said pressure data;

f) determining whether said monitor well and said production well have interference based on temperature fluctuations detected in said DAS data and fluctuations in said pressure data and determining a location along said length where said interference is occurring based on temperature fluctuations detected said DAS data; and g) optimizing a hydrocarbon production plan based on said determined interference and said determined location.

A method as described herein, wherein DAS data is downsampled to <1 Hz.

A method as described herein, wherein pressure is varied during said opening step.

A method as described herein, further comprising measuring pressure in said monitor well and said production well during said opening step d or throughout said method.

A method as described herein, wherein said interference and said location are confirmed by switching the identity of said monitor well and said production well and repeating said method.

A method as described herein, wherein said one or more fiber optic cables are cemented in behind a casing in said monitor well.

A method as described herein, wherein said one or more fiber optic cables are cemented in behind a casing in said monitor well and said method further comprising correcting for a delay in temperature change as it propagates through said case and said cement to said one or more fiber optic cables.

A method as described herein, wherein said one or more fiber optic cables are deployed into said monitor well via wireline, coil tubing, or carbon rod.

A method as described herein, wherein said period of time is 1-5 hours.

A method as described herein, wherein said method further includes estimating cross flow velocity of said interference by comparing the DAS data with co-located temperature gauge or DTS data.

A method as described herein, wherein said interference and said location are confirmed by switching the identity of said monitor well and said production well and repeating said method.

Any method described herein, including the further step of printing, displaying or saving the initial, intermediate or final (or both) datasets of the method to a non-transitory computer readable memory.

Any method described herein, further including the step of using the final datasets in a reservoir modeling program to predict reservoir performance characteristics, such as fracturing, production rates, total production levels, rock failures, faults, wellbore failure, and the like.

Any method described herein, further including the step of using said final datasets to design, implement, or optimize a hydraulic fracturing program, a completion program or a hydrocarbon production program in the same or in a similar reservoir.

Any method described herein, further including the step of producing hydrocarbon by said reservoir according to said optimized programs.

This summary is provided to introduce a selection of concepts that are further described below in the detailed description. This summary is not intended to identify key or essential features of the claimed subject matter, nor is it intended to be used as an aid in limiting the scope of the claimed subject matter.

As used herein, "providing" a well or a fiber optic cable does not imply or require contemporaneous drilling or installation of cables, as wells may already exist, and wells may already be fitted with the needed cables. Furthermore, it is recognized that the various steps of well drilling, completion, logging and production may be undertaken by different specialists and/or independent contractors, all under the direction of the lease owner/operator, and these third party activities are to be considered as falling under activities by the owner/operator.

"Fracking", as used herein, may refer to any human process used to initiate and propagate a fracture in a rock formation, but excludes natural processes that fracture formation, such as natural seismic events. The fracture may be an existing fracture in the formation, or may be initiated using a variety of techniques known in the art. "Hydraulic Fracking" means that pressure was applied via a fluid.

As used herein, "fracture parameters" refers to characteristics of fractures made using hydraulic fracking and includes fracture growth, fracture height, fracture geometry, isolation conditions between stages, stress shadows and relaxation, fracture spacing, perforation cluster spacing, number of perforation clusters/stage, well spacing, job size, pumping pressure, heel pressure, proppant concentration, fluid and proppant distribution between perforation clusters, pumping volume, pumping rate and the like.

As used herein, a "fracture model" refers to a software program that inputs well, rock and fracturing parameters and simulates fracturing results in a model reservoir. Several such packages are available in the art, including SCHLUMBERGERS® PETREL® E&P, FRACCADE® or MANGROVE® software, STIMPLAN™, tNAVIGATOR™, SEEMYFRAC™, TERRAFRAC™, ENERFRAC®, PROP®, FRACPRO™, and the like. Add GOHFER® (Barree & Associates LLC) For shale reservoirs, FRACMAN™ and MSHALE™ may be preferred. These models can be used with appropriate plugins or modifications needed to practice the claimed methods.

By "fracture pattern", we refer to the order in which the frack zones are fractured.

The term "fracture complexity" refers to the degree of entanglement (or lack thereof) in the induced fractures. Fractures can range from simple planar fractures to complex planar fractures and network fracture behavior. Further, the fracture complexity can change from near-well, mid-field, and far-field regions.

As used herein, the "Gaussian Kernel" or "radial basis function kernel" aka "RBF kernel" is a popular kernel function used in various kernelized learning algorithms. In particular, it is commonly used in support vector machine classification.

As used herein, a "monitoring" well is a well nearby a producer that is used to monitor a producer. It produces samples and data for control purposes and could also be called a reference well or observation well. Obviously, well purposes can vary over time, and a production well can be used to monitor another nearby production well, and thereafter be converted back to production.

As used herein, "cross-well interference" is unintentional fluid communication between nearby wells, usually as a result of fractures connecting across the distance between the wells.

As used herein, "operation" well and "production" well are used interchangeably.

The term "many-core" as used herein denotes a computer architectural design whose cores include CPUs and GPUs. Generally, the term "cores" has been applied to measure how many CPUs are on a giving computer chip. However, graphic cores are now being used to offset the work of CPUs. Essentially, many-core processors use both computer and graphic processing units as cores.

As used herein, the term "spike noise" refers to random bursts of noise in the acquired data.

As used herein, the term "semblance analysis" or "semblance function" refers to a process used in the refinement and study of seismic data to greatly increase the resolution of the data despite the presence of background noise.

As used herein, the term "thermal signal moveouts" refers to the velocity of the temperature signal.

As used herein, the term "FK filter" refers to a two-dimensional Fourier transform over time and space where F is the frequency (Fourier transform over time) and K refers to wave-number (Fourier transform over space).

As used herein, the term "joint inversion" uses one data as a priory constraint in the inversion of other data. More sophisticated approaches include all data sets (in general two, three, or more) in a single inverse algorithm.

As used herein, "drift removal" or "removing baseline drift" refers to correcting for a slow shifting of the baseline of the data. The low-frequency drift can be handled in two ways, depending on the type of signal being detected. If the desired low frequency DAS signal is temperature based and an independent temperature measurement is used, such as a distributed temperature sensor (DTS) which is commonly acquired simultaneously with DAS, then a joint inversion can remove the drift (as described in US20170260846). If the signal is not temperature based, or it is temperature based however there is not an accurate independent measurement of absolute temperature, then we search for a section of channels of the fiber at a single time that is determined to have a nonexistent, or low, signal strength. Once the quiet section is determined for each time sample, the median of the designated channels can be used to extract a time dependent drift function which can then be subtracted from all channels at each time to remove the drift.

DRIFT t=MEDx(xqi t) xq is a set of quiet depth channels, t is time, MEDx is a median calculation of just the channel dimension, and DRIFT(t) is the time dependent drift calculation for each time sample, t.

As used herein the term "median filter" refers to a nonlinear digital filtering technique, often used to remove noise. The main idea of the median filter is to run through the signal entry by entry, replacing each entry with the median of neighboring entries. The pattern of neighbors is called the "window", which slides, entry by entry, over the entire signal. For ID signals, the most obvious window is just the first few preceding and following entries, whereas for 2D (or higher-dimensional) signals such as images, more complex window patterns are possible (such as "box" or "cross" patterns). Note that if the window has an odd number of entries, then the median is simple to define: it is just the middle value after all the entries in the window are sorted numerically. For an even number of entries, there is more than one possible median, see median for more details.

As used herein, a "bandpass filter" refers to a device that passes frequencies within a certain range and rejects (attenuates) frequencies outside that range.

As used herein, "envelope soft limiting techniques" refers to setting an amplitude range in the signal envelope, $xx>x2>0$, where $xmax>x2$, with xmax being the maximum envelope value in the investigation range. An individual envelope value $e-\hat{}s$ replaced if $xmax \geq ex > x2$ such that $et=6l$ $2(-L-x2)+x2$.

$xmax \sim x2$

As used herein, "thermal recoupling" refers to the removal of the temperature diffusion effect caused by the sensor not being in direct contact with the measurement medium.

As used herein, "semblance techniques" refers to a calculated velocity measurement as used in US20170260839, incorporated by reference in its entirety for all purposes. SNR increases calculated semblance accuracy.

As used herein, "diffusivity settings" refers to the thermal properties of the material between the measurement medium and the sensor. Additional details are provided in US20170342814 and US2018045040, incorporated by reference in its entirety for all purposes.

As used herein, "automatic gain control" refers to a technique used to keep the signal amplitude over a particular window roughly constant so that amplitude variations do not bias the analysis.

As used here, a "low frequency" signal refers to a frequency component of the DAS signal that has a period of about 1 second or greater for an interferometer length of a few meters. By using the phase of the low frequency components of the DAS signal, the temperature changes of the well can be estimated and monitored in real time and with much higher precision than is possible with a conventional short DTS measurement. The processor is configured to process DAS signal data to separate out the low frequency oscillations present in DAS signals.

As described herein, the temperature difference required to shift the signal by one interferometer fringe is about 0.15° C./L or up to a factor of two. For reasonable laser pulse widths this allows for the real time monitoring of well temperature changes.

A "conversion" refers to mathematical transformation of data into a physical measurement. As used herein, we convert DAS raw phase data into the temperature variation.

An "inversion" refers to the estimation of the result by minimizing a particular error function. As used herein, we invert the accurate temperature measurement from DAS and DTS data.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| bbl | oil barrel |
| C-OTDR | Coherent Optical Time Domain Reflectometer |
| CT | Computer tomography |
| DAS | Distributed Acoustic Sensing |
| DTS | Distributed temperature sensing |
| G | Gauges |
| IU | Interrogator Unit |
| OTDR | Optical Time Domain Reflectometer |
| P | producer well |
| S | data well |
| SNR | signal to noise ratio |
| SRV | simulated rock volume |
| TVD | True vertical depth |

DETAILED DESCRIPTION

Herein, we use the data from two adjacent hydraulically fractured horizontal production wells. However, a similar procedure can be used for other kinds of wells.

Because DAS is a strain rate sensor and the fiber is mechanically coupled with the formation, strain from the minute temperature variations caused by interference can be detected. The DAS data are recorded at an offset monitor well during production of an adjacent well. The fiber-optic cables are preferably installed outside the casing and cemented in place. The raw data are sampled at 10 kHz continuously at more than 6000 locations along the wellbore, with 1 m spatial sampling and 5 m gauge length. The recorded optical phase is differentiated in time, hence the DAS data are linearly correlated with the strain rate along the fiber.

The raw DAS data are down-sampled to 1 s after a low-pass anti-aliasing filter (0-0.5 Hz) is applied. The data are then median filtered to remove any spiky noise. Another low-pass filter with a corner frequency of 0.05 Hz is then applied. A DC drift with an amplitude around 0.1 rad/s is removed from the data as well. The DC drift was channel invariant and does not vary significantly with time. The drift noise is most likely associated with interrogator noise. We estimated the DC drift by calculating the median value of the channels that were out of the zone of interest at each time interval. Compared to the industry standard waterfall visualizations, the low-frequency processing not only increased the signal-to-noise ratio of the signal, but also preserved the strain rate polarity, which is important for our interpretations. The strain change recorded by DAS at this frequency band can be caused by thermal variation and/or mechanic strain perturbation.

The DTS data are recorded at the same monitor well as the DAS data. The DTS data can be recorded during or before the DAS data recording. The raw data are sample at 5 minutes continuously with 1 ft spatial resolution. The data are averaged for several hours to obtain a reliable borehole temperature profile during shut-in. The recorded DTS data are calibrated to remove the attenuation induced measurement error.

Figure 2:
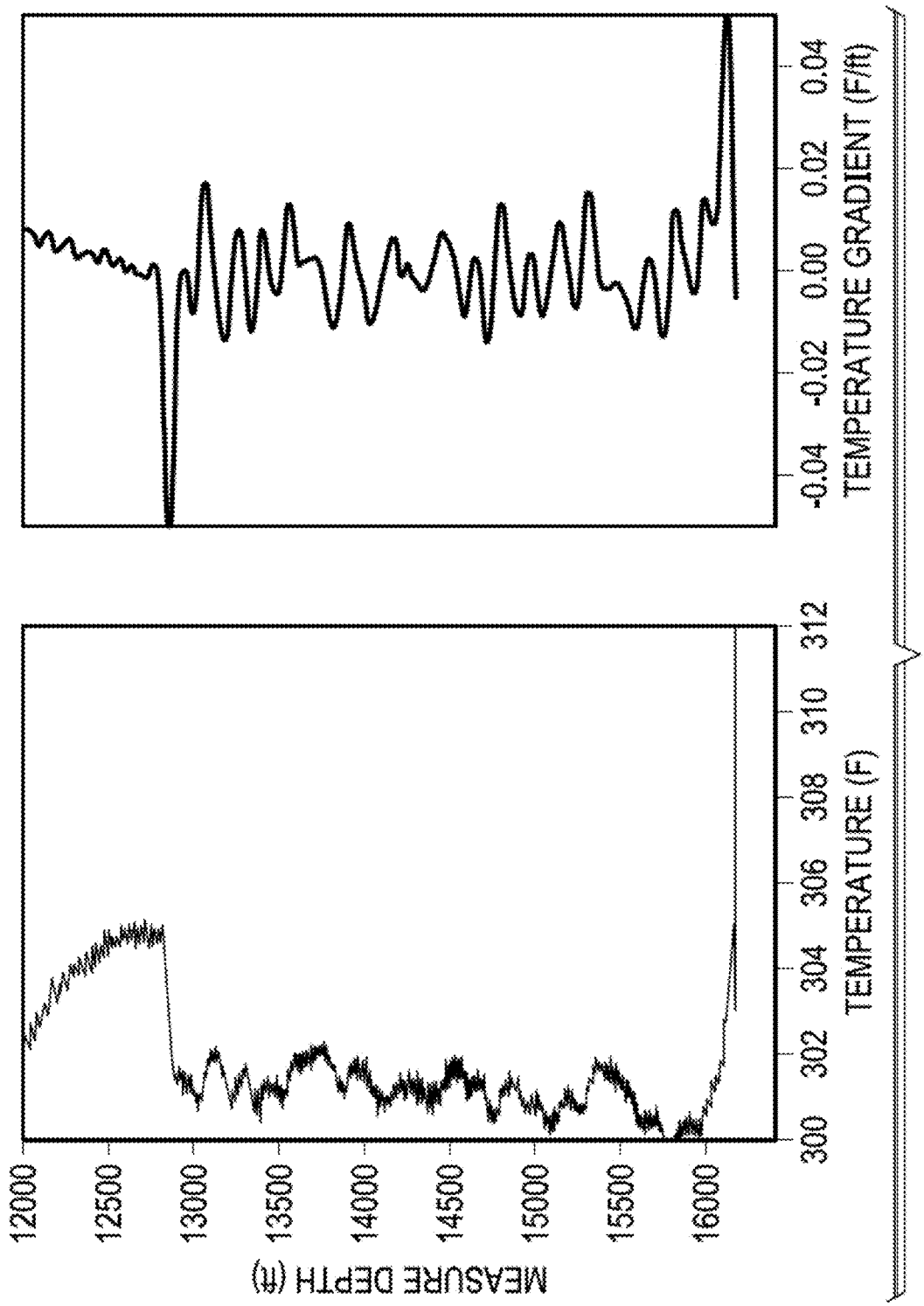
FIG. 2: DTS temperature measurement in the monitor well during shut-in period. Left: temperature profile. Right: temperature spatial gradient.

Because the wells are hydraulically fractured, the uneven completion at each perforation induces a thermal spatial gradient during the shut-in period. FIG. 2 shows an example of the temperature profile in a monitor well after a 24-hour shut-in, measured by DTS. The heel-most perforation in this well is located around 13000 ft, where the temperature drops dramatically. Spatial temperature gradients around $10^{-3}$-$10^{-2}$ F/ft can be observed in the stimulated section (13000-16500 ft), which is important to create the signals required for this method.

After the operation well is opened, the borehole pressure drops due to the production. This pressure perturbation propagates away from the operation well through the conductive fracture network. If the monitor well and the operation well are interconnected by fractures, the pressure in the monitor well will also be perturbed, whereas the pressure would otherwise not change. These pressure changes will cause flow from the monitor well towards the lower pressure zone near the production well, and that can be detected by temperature changes causes by the flow.

Figure 3:
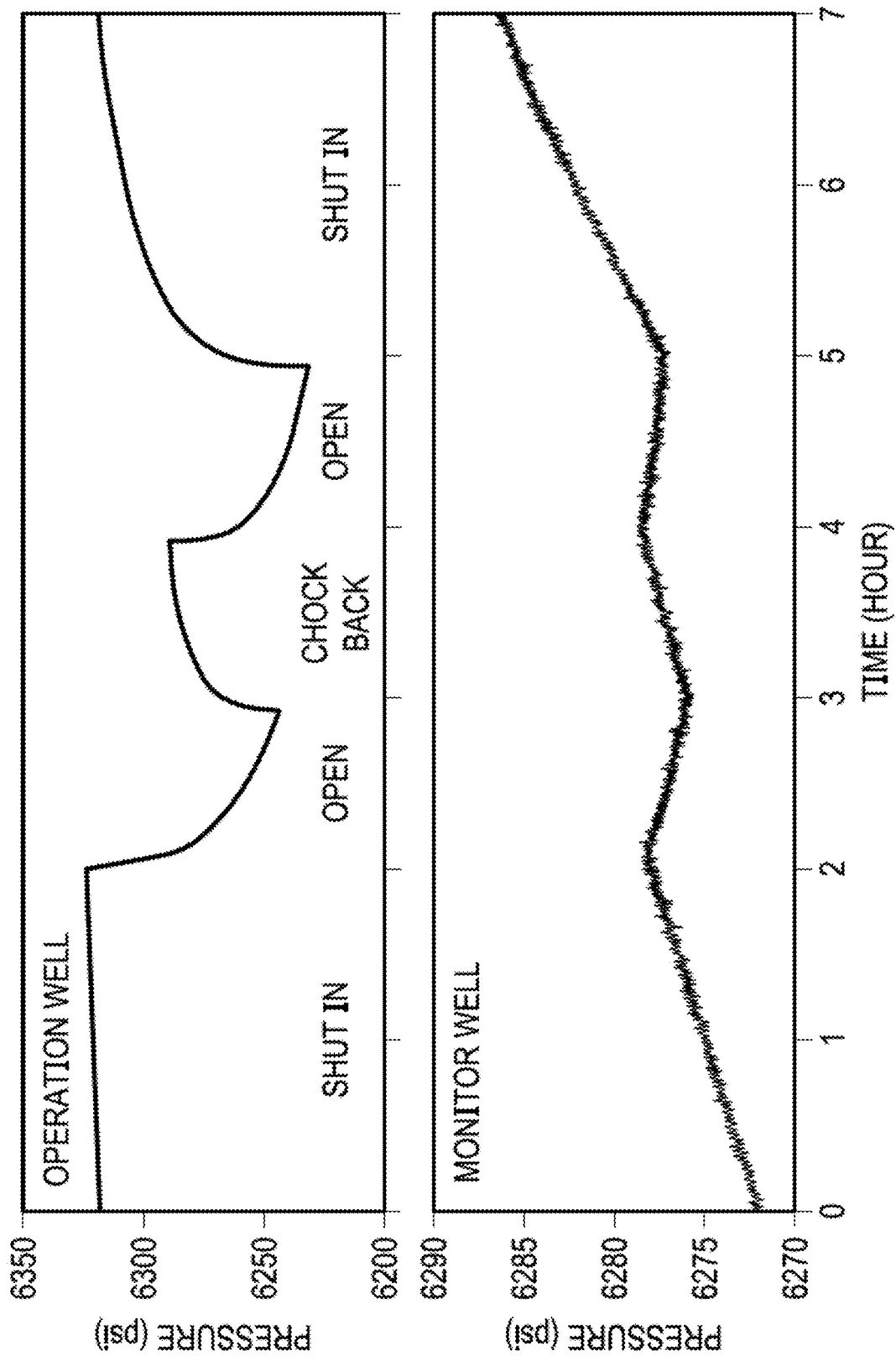
FIG. 3: Borehole pressure gauge measurements. Top: Pressure measured in the operation well, with associated well operations. Bottom: Pressure measured in the monitor well.

FIG. 3 shows the pressure response in both wells due to a series of choke-size changes in the operation well. In this example, the well spacing was around 700 ft. Pressure was measured using bottom hole sensors. The pressure perturbation near the monitor well was not uniform because the conductivity of the fractures was spatially heterogeneous. The highly connected fractures had lower pressure than the less connected fractures. The spatial gradient of pressure along the monitor well induced cross flows in the monitor well borehole, with the fluid flowing from the weakly connected fractures towards the highly connected fractures.

Due to the spatial gradient of temperature in the monitor well (FIG. 2), the cross flows produce small temperature perturbations, which can be approximated as:

$$\frac{dT}{dt} = -v\frac{dT}{dx}, \tag{1}$$

where v is the cross-flow velocity, T is the monitor well borehole temperature, t=time, and x is distance or position. We only consider the convection induced temperature perturbation, while ignoring the temperature mixing due to the reservoir fluid entering the borehole through perforations. We also ignore thermal conduction from surrounding formations. This assumption significantly simplifies the data analysis, and captures the majority of the signal amplitude.

Figure 4:
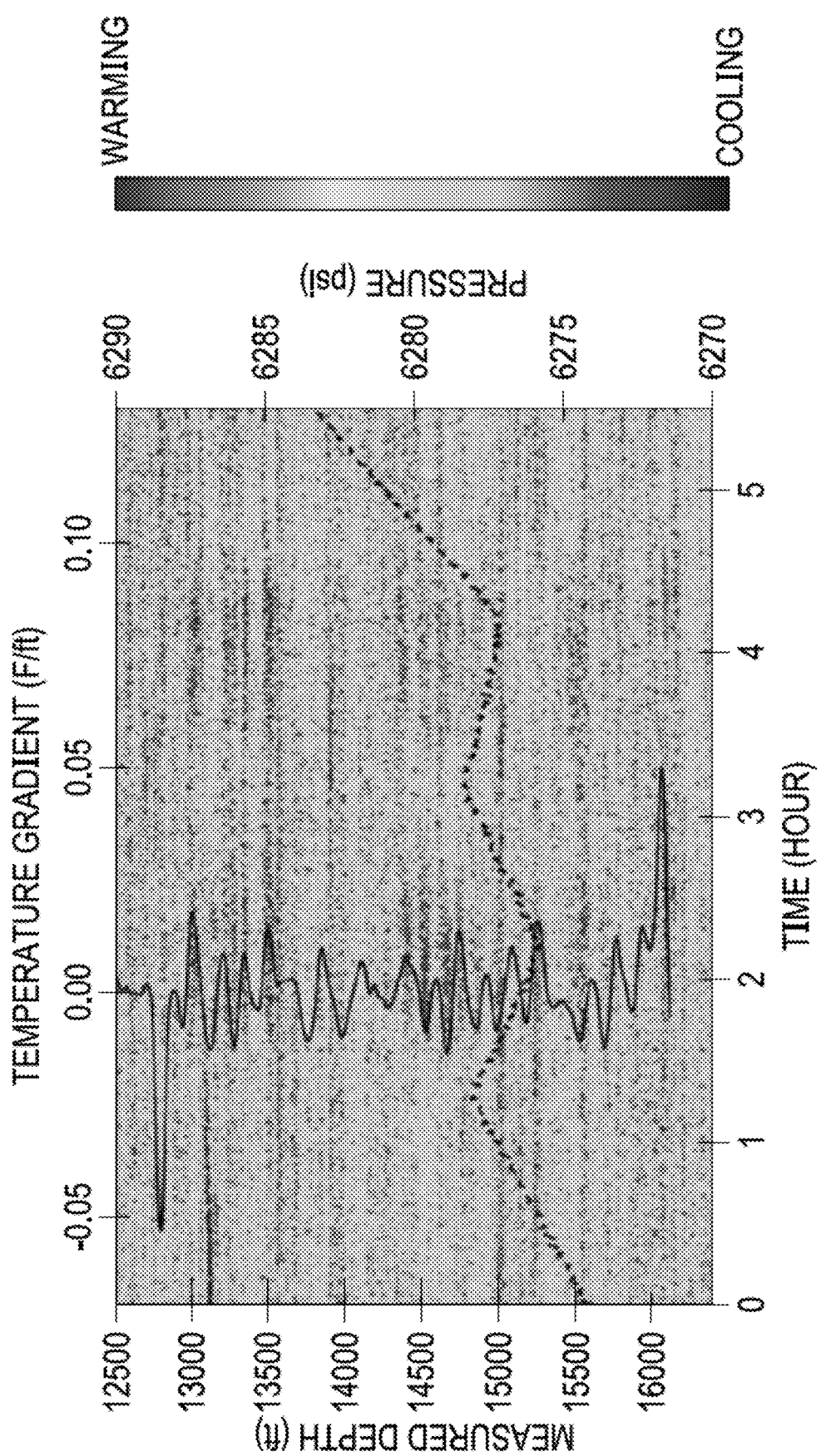
FIG. 4: Low-frequency DAS response in the monitor well compared with temperature spatial gradient and borehole pressure during the operation well choke changes. Colormap in the background is the DAS signal, vertical black curve is the temperature gradient profile measured by DTS (FIG. 2), and horizontal dashed line is the borehole pressure in the monitor well (FIG. 3).

Because the DAS signal at the ultra low-frequency band (<0.1 Hz) is sensitive to temperature variations as small as $10^{-5}$° F., it can be used to measure the cross-flow induced temperature perturbations. FIG. 4 shows the DAS response at the monitor well during a series of choke changes in the operation well, compared with the spatial gradient of temperature measured by DTS (FIG. 2) and borehole pressure measured by a pressure gauge (FIG. 3). The DAS response is highly correlated with the pressure changes in the temporal domain, and with spatial gradient of temperature in the spatial domain. The DAS response is interpreted as small thermal perturbations due to the cross flows between the monitor well perforations. The cross flows are caused by the spatial heterogeneity of connectivity between the operation well and the monitor well.

The thermal perturbation measured by DAS is mainly controlled by EQ 1, which can be rewritten as:

$$D(x, t) = -\lambda v(x, t)\frac{dT}{dx}(x), \tag{2}$$

where D is the low-frequency DAS signal, and $\lambda$ is a constant that converts optical phase measured by DAS into temporal gradient of temperature. If we assume the connectivity does not change during the period of data acquisition, we can further simplify the signal as:

$$D(x, t) = -\lambda V(t)R(x)\frac{dT}{dx}(x) = A(t)B(x), \tag{3}$$

where V(t) and R(x) describe how the magnitude of the cross-flow velocity changes with time and space, respectively. From this equation, we can see that the DAS signal can be approximated by the product of two one-dimensional, separable functions (A and B) that describe the variation in time and space respectively.

The A(t) and B(x) can be obtained by applying singular-value decomposition (SVD) on the DAS data. The SVD operation decompose the DAS data D(x; t) into the summation of a series production of eigenvectors and eigenvalues:

$$D(x, t) = \sum_i u_i(x)\sigma_i v_i(t) \approx u_1(x)\sigma_1 v_1(t), \tag{4}$$

where $u_i$ and $v_i$ are the left and right eigenvectors, and $\sigma_i$ is the eigenvalue. The eigenvalues are sorted in descending order. It is worth mentioning that $u_i$ is a column vector while $v_i$ is a row vector, and the outer product of the two is a 2D matrix. Based on EQ 3, we can use the first (largest) eigenvalue and its corresponding eigenvectors to approximate the signal.

Extra processing steps may be considered to acquire better $u_1$ and $v_1$ estimation. For example, $u_1$ and $v_1$ can be calculated independently using different section of the data. For the DAS data in FIG. 4, $u_1(x)$ is evaluated using only the data from 1.5-4.5 hours, where the signal is strongest and crossflow has subsided.

On the other hand, only the data from measured depth (MD) 13500 ft and beyond is used to evaluate $v_1(t)$ in order to avoid the effect of the large un-related signal around 13200 ft. $u_1$ and $v_1$ are then low-pass filtered to reduce the noise.

Figure 5:
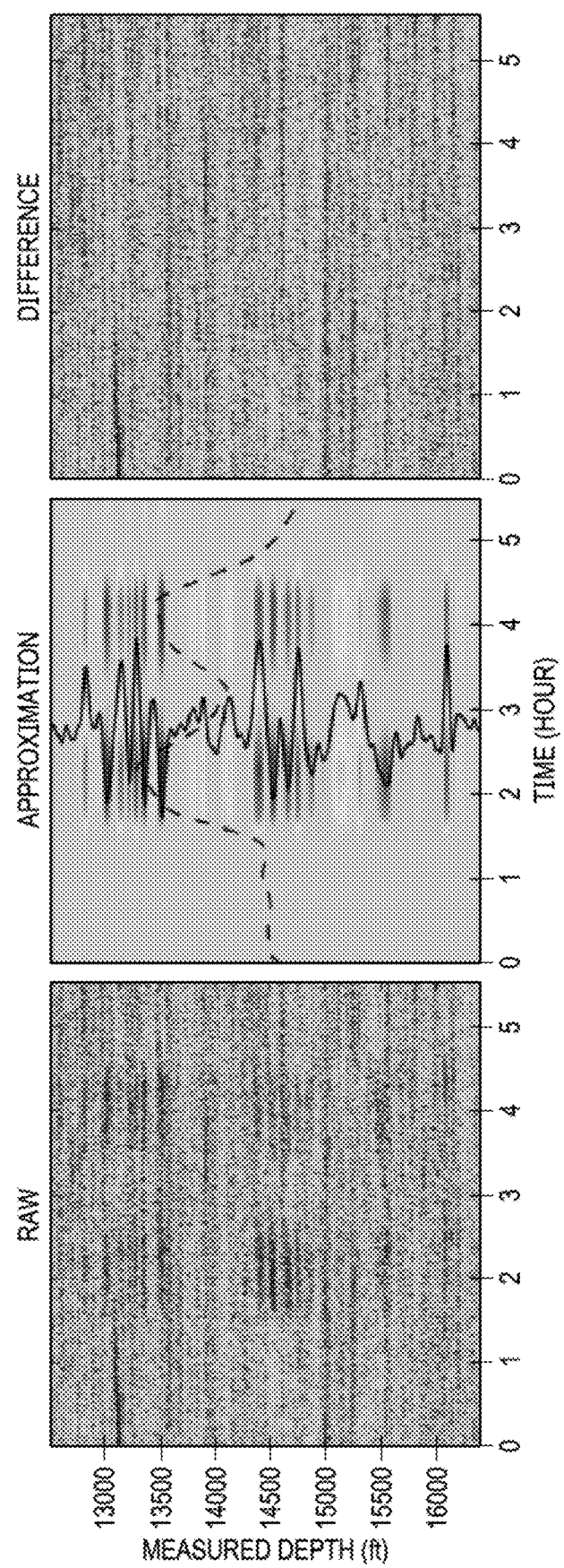
FIG. 5: Comparison between the raw DAS data and the approximation using EQ 4. Vertical solid line and horizontal dashed line in the middle panel show the eigenvectors $u_1(x)$ and $v_1(t)$.

A comparison between the original DAS data and the approximation using the first (largest) eigenvalue σ1 and corresponding eigenvectors $u_1$ and $v_1$ (EQ 4) is shown in FIG. 5. This operation preserves the majority of the signal amplitude, while dramatically reduces the noise.

More importantly, it decomposes the DAS signal into two separate 1-D functions that describe the temporal and spatial variations separately. In this method we assume the communication does not change within the measurement period, which is usually only a few hours.

Substituting EQ 4 into 3 results in:

$$\frac{1}{\alpha}u_1(x) = -R(x)\frac{dT}{dx}(x) \tag{5}$$

$$\alpha\sigma_1 v_1(t) = \lambda V(t),$$

where a is a scaling constant.

Figure 1:
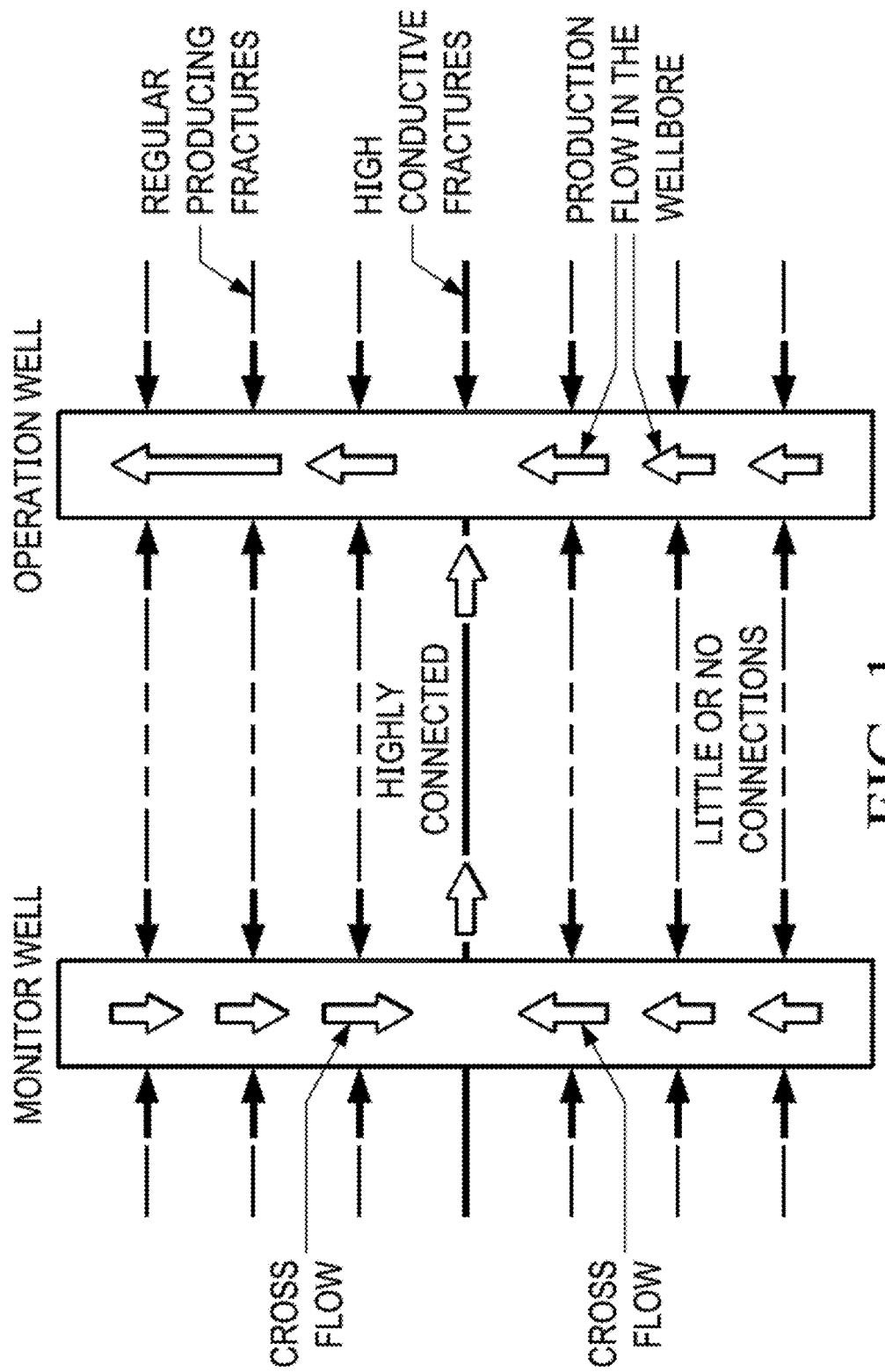
FIG. 1: Conceptual model of cross flows in the monitor well induced by the connection to the operation well.
Figure 6:
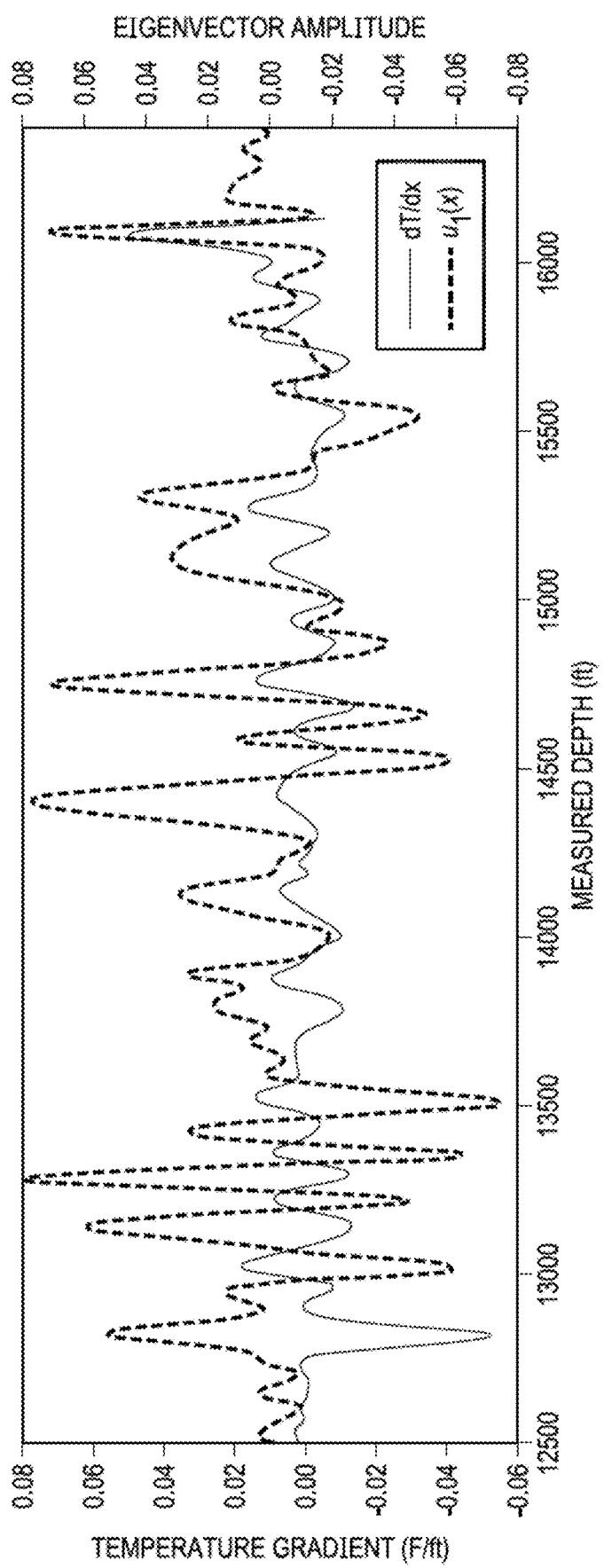
FIG. 6: Comparison between the spatial gradient of temperature $dT/dx$ measured by DTS and the spatial eigenvector $u_1(x)$ estimated from DAS data.

FIG. 6 shows the comparison between the spatial gradient of temperature dt/dx measured by DTS and the eigenvector $u_1(x)$ estimated from DAS data. It is clear that parts of these two curves are correlated, while the other parts are anti-correlated. This is due to the different sign of αR(x), which indicates the direction of the cross flows changes along the wellbore, like the one shown in FIG. 1. It is also noticeable that there is a small shift between these two curves, especially around 14000-15000 ft. This spatial shift is due to the small moveout in the signal due to the convection, which can be easily removed by dynamic warping or other time-shift corrections.

αR(x) can be inverted by minimizing the misfit between $u_1(x)$ and αR(x) dt/dx, which can be achieved by a least-square inversion minimizing the penalty function:

$$\epsilon^2 = \int\left(u_1(x) + \alpha R(x)\frac{dT}{dx}\right)^2. \tag{6}$$

This inversion can be further stabilized by reducing degrees of freedom for αR(x). Herein we use piecewise cubic interpolation with ten evenly spaced control points, which can be performed by matrix operations:

$$c=(G^TG)^{-1}G^Tu_1, \tag{7}$$

where coefficient matrix $G=T_xM$. $T_x$ is a diagonal matrix with the diagonal elements equal to dT/dx, and M is the interpolation matrix. c is the value at the control points.

Figure 7:
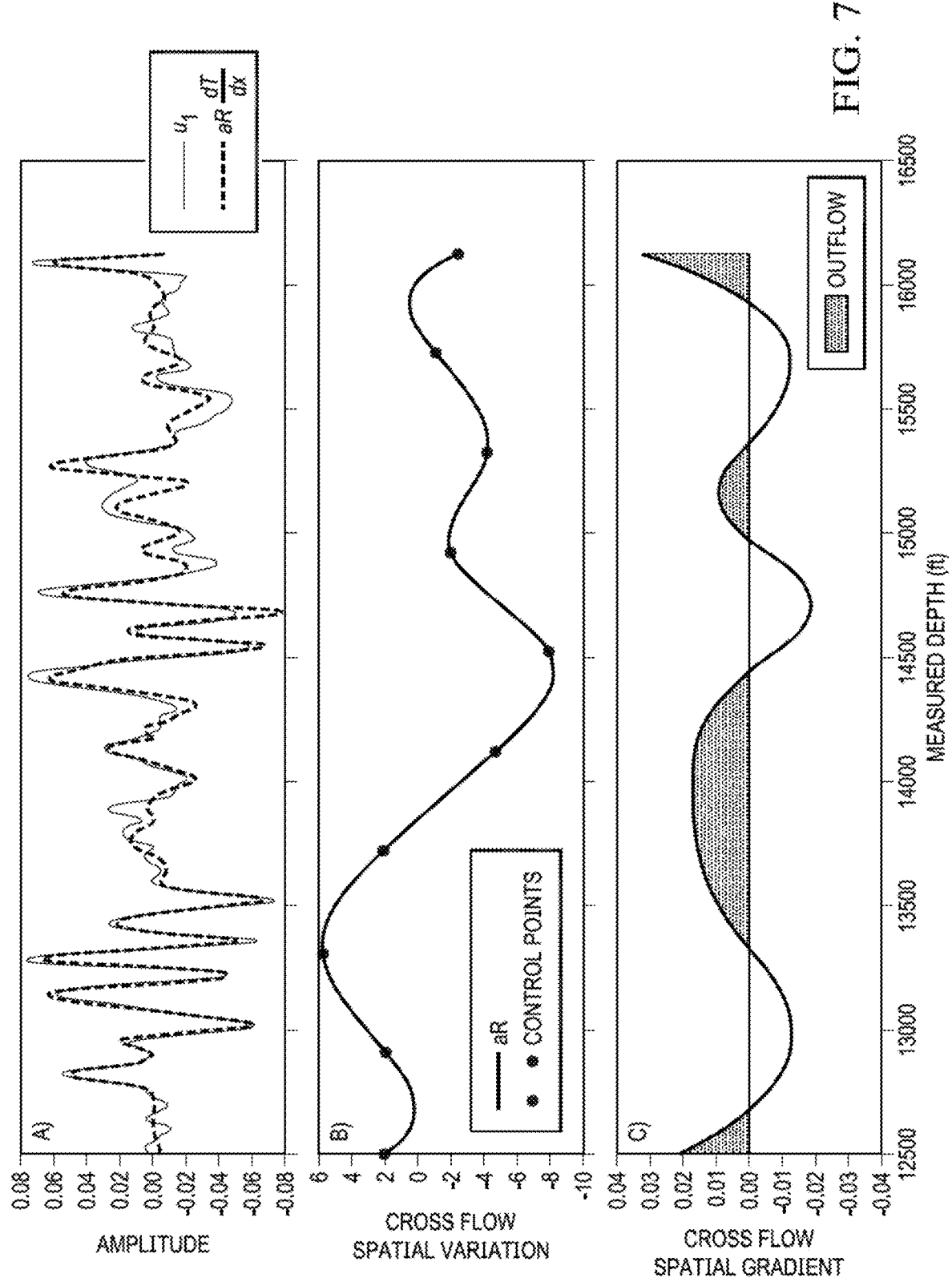
FIG. 7: Inversion results for the cross flow spatial variation. a) time-shifted $u_1$ and the model prediction $\alpha R dT/dx$. b) inverted $\alpha R(x)$ and the control points c. c) negative spatial gradient of $R(x)$, with positive value indicates outflow when the operation well opens.

FIG. 7 shows the results of the least-square inversion. Positive value of R(x) indicates toe-ward cross flows. The spatial gradient of R(x) indicates inflow/outflow at each section. As demonstrated in FIG. 1, the well sections with stronger connections are associated with outflows (fluid flows from wellbore into formation) in the monitor well when the operation well opens. In this case, there are three zones that indicate stronger connections, by ignoring the outflow at the heel (12500 ft) which is probably due to the edge effect of the cubical interpolation.

Figure 8:
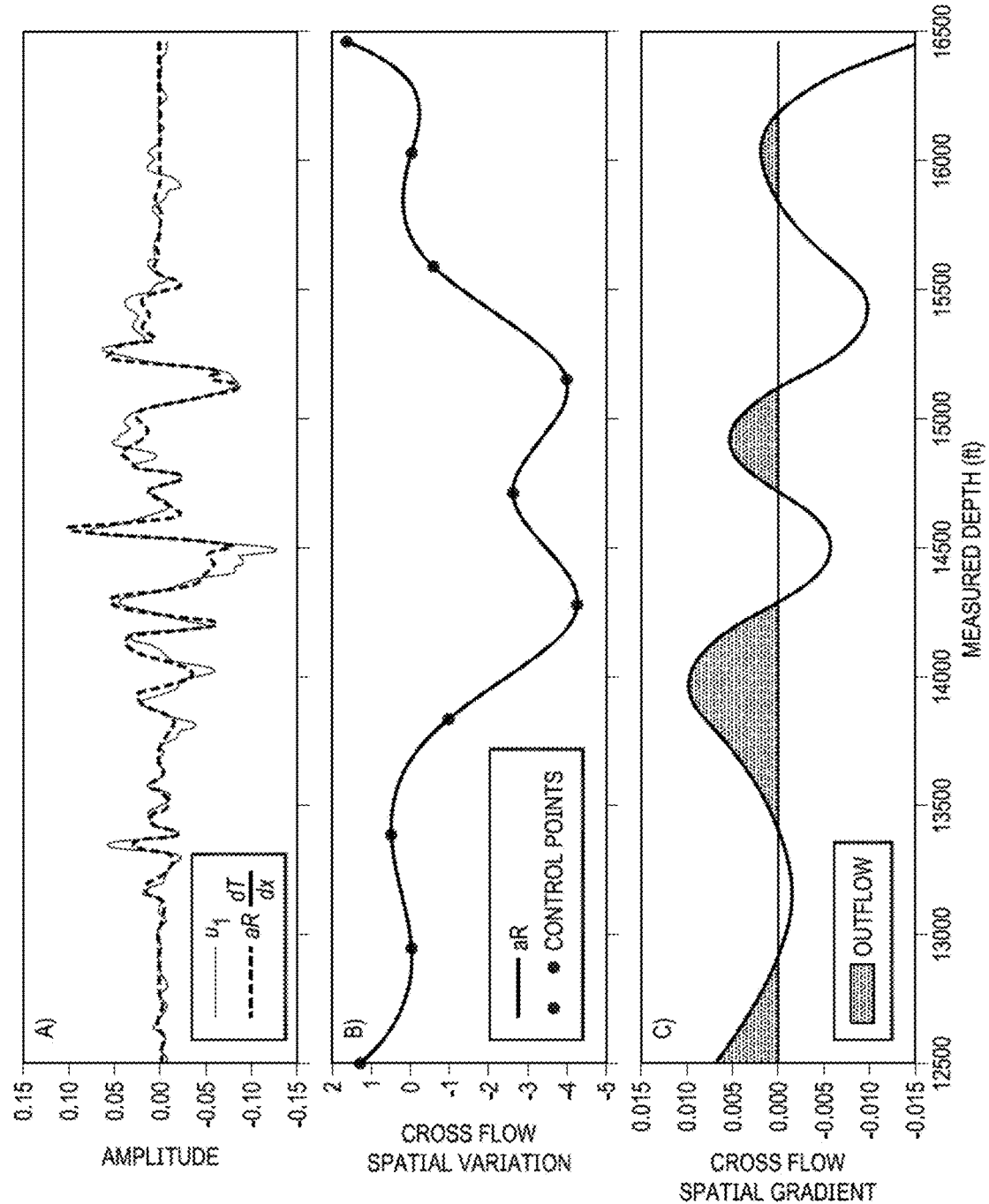
FIG. 8: Same as FIG. 7, except the operations of the wells are switched.

The connection between the wells should be bidirectional, which means that similar outflow locations should be observed if the operations of the wells are switched. FIG. 8 shows the result of the same inversion, except monitor and operation wells are interchanged. Three similar outflow zones can be clearly observed in FIG. 8c, although the DAS response in FIG. 8a is very different from that in FIG. 7a.

Figure 9:
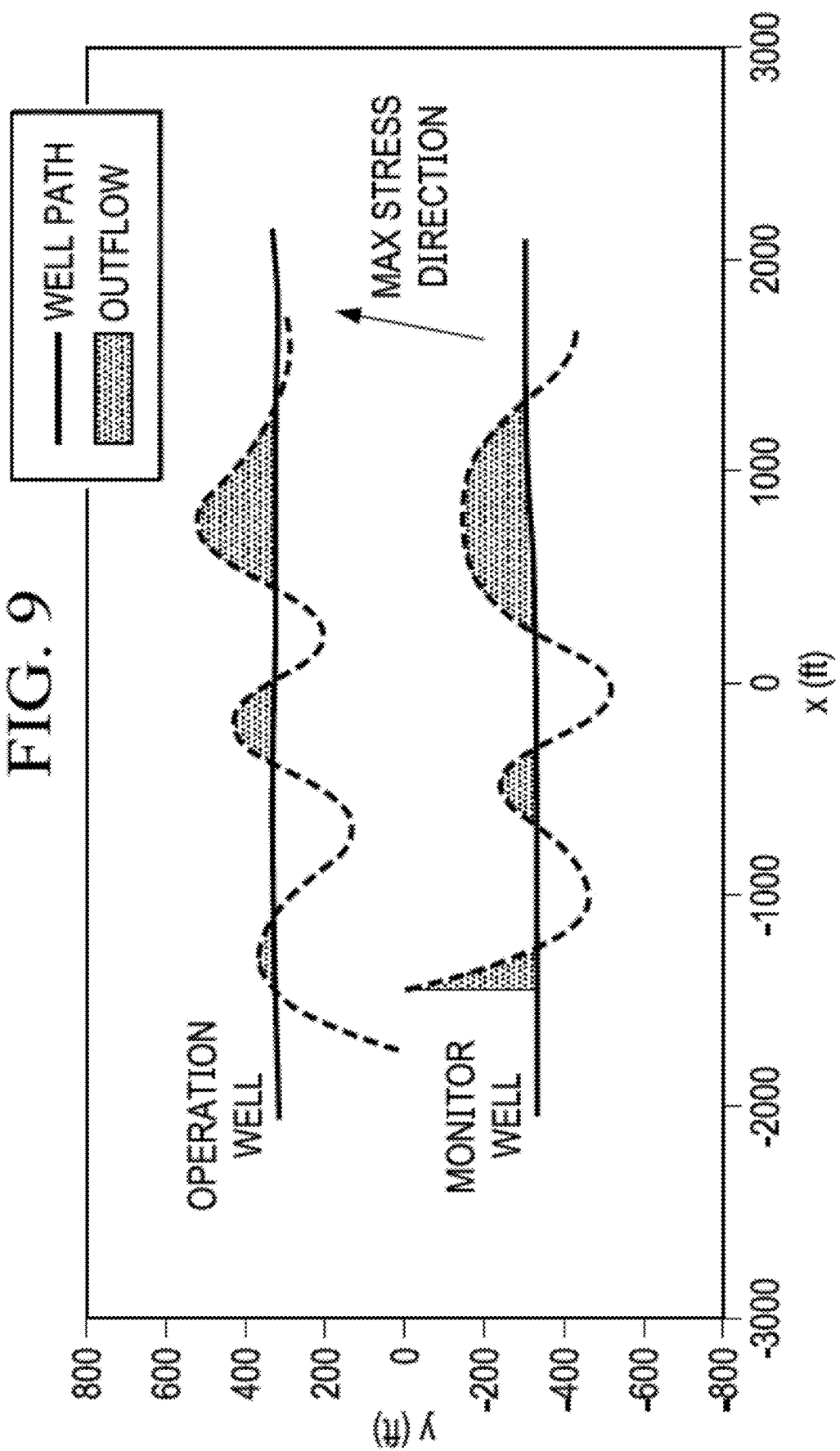
FIG. 9: Spatial distribution of the outflow in FIG. 7c and FIG. 8c.

FIG. 9 shows the spatial distribution of these outflow zones in both wells by plotting them along the well paths. These outflow zones indicate the locations of stronger connections between the two wells, which is consistent with the regional maximum stress direction, as well as the cross-well fracture hits detected during completion, using the method described in (Jin & Roy, 2017).

Figure 10:
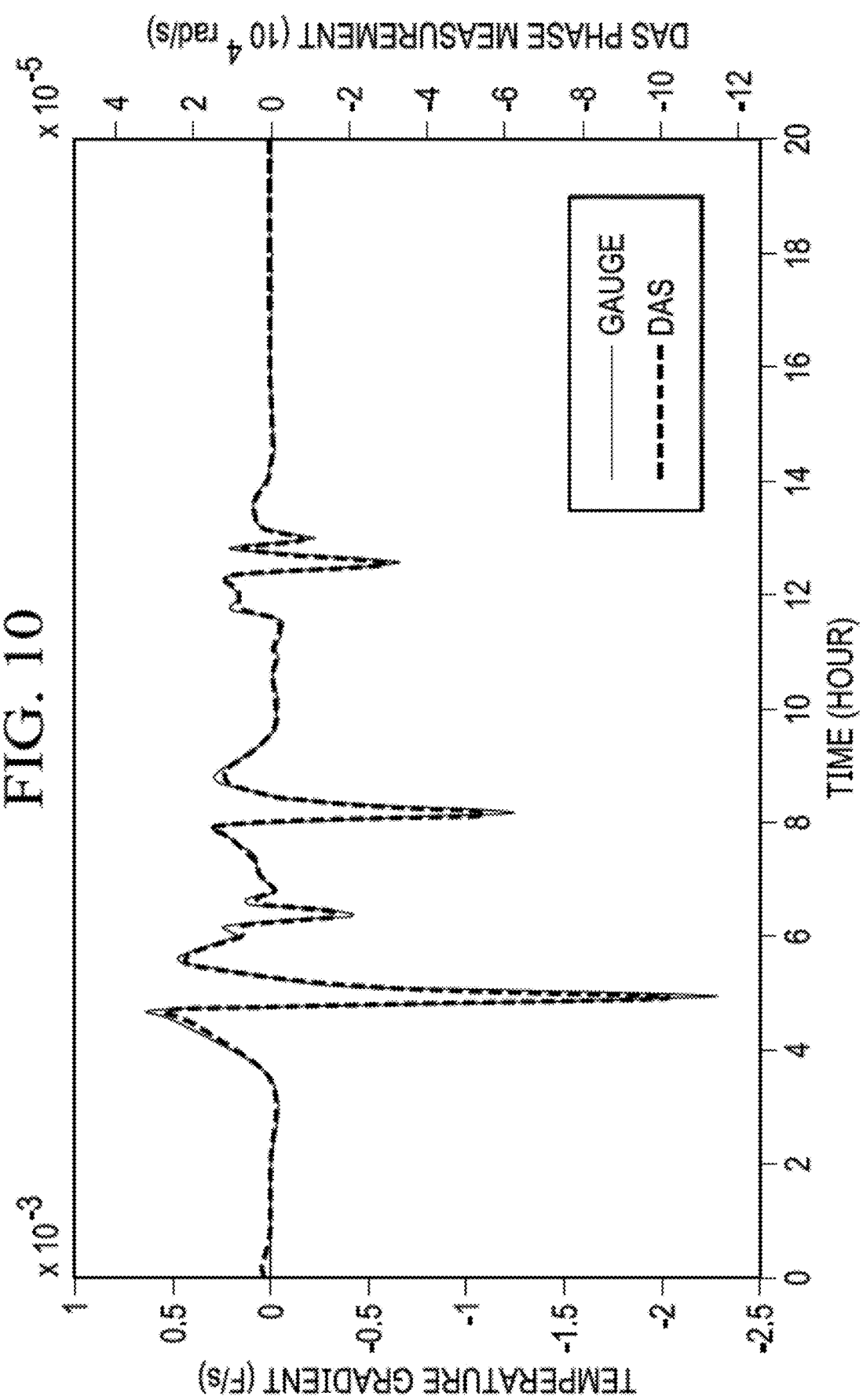
FIG. 10: The comparison between the data from a DAS channel and the co-located borehole temperature gauge. The gauge data is differentiated in time to obtain the temperature gradient.

The connectivity between the wells can be further quantified by acquiring cross-flow velocity. This estimation requires knowing the scaling factor λ between the DAS optical phase measurement and the temporal gradient of temperature. λ can be estimated by comparing the DAS response with the co-located temperature gauge or DTS data. FIG. 10 shows the data comparison between a DAS channel in the monitor well and the co-located borehole temperature gauge. The two signals are linearly correlated, and λ can be easily estimated by a linear regression. In the case of evaluating λ using DTS, the workflow described in Jin et al. (2017b) can be referred.

Figure 11:
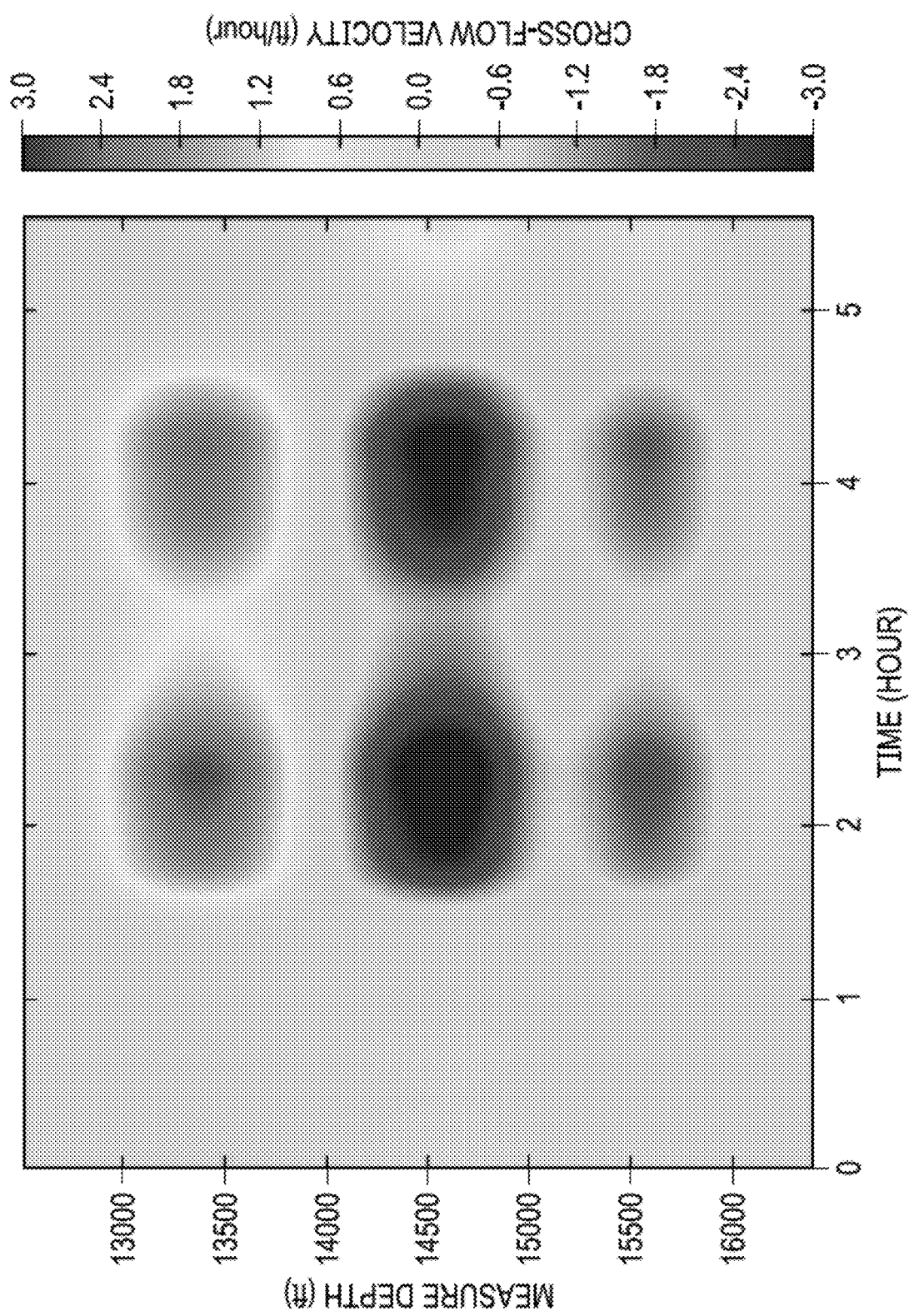
FIG. 11: Calculated cross-flow velocity in the monitor well.

After λ is known, $1/\alpha V(t)$ can be easily obtained by:

$$\frac{1}{\alpha}V(t) = \frac{\sigma_1 u_1}{\lambda}, \quad (8)$$

which can then by multiplied by previously calculated R(x) to get the cross-flow velocity $v(x; t)$ R(x)V (t). FIG. 11 shows the calculated cross-flow velocity. Velocities as slow as 1 ft/hour can be detected using this method. If the radius of the borehole casing is known, the volume rate of the outflow can also be calculated.

The analysis described herein provides a means to measure the spatial variation of inter-well connectivity during the production stage. The demonstrated example is from two nearby hydraulically fractured production wells. However, the method can be applied to any wells that have a spatial gradient of temperature during a shut-in period.

It is worth emphasizing that the outflow zone locations shown in FIG. 9 are not the only connected locations between the wells, but the locations with stronger connectivity. Therefore, this method measures well connectivity in relative terms. By combining the borehole pressure measurement (FIG. 3), it is possible to constrain the fracture conductivity using reservoir models. This method provides the spatial information of well interference that no other method provides, which is valuable for completion and well spacing optimization.

This method can be applied on either temporarily deployed or permanently installed fiber cables. However, if the fiber used for DAS measurement is installed behind production casing and cemented in place, the heat conduction effect should be corrected when calculating the V(t), since the temporal variation of temperature can be delayed and attenuated as it propagates from the borehole, through the casing and cement, and into the fiber. The correction can be applied by solving a 1D radial diffusion equation, and is described in Kreuger (2017). A similar correction should be applied if the fiber is temporarily deployed through coil tubing or wirelines with large radius, where the thermal conductivity effect is not negligible.

The following references are each incorporated by reference in its entirety for all purposes:

Awada, A., et al. (2016). Is that interference? A work flow for identifying and analyzing communication through hydraulic fractures in a multiwell pad. SPE Journal, 21 (05), 1-554.

Jin, G., & Roy, B. (2017). Hydraulic-fracture geometry characterization using low-frequency DAS signal. The Leading Edge, 36 (12), 975-980.

Le Calvez, J. H., et al. (2007). Real-time microseismic monitoring of hydraulic fracture treatment: a tool to improve completion and reservoir management. AAPG Search and Discovery Article #90171 CSPG/CSEG/CWLS GeoConvention 2009, Calgary, Alberta, Canada, May 4-8, 2009

SPE-140561-MS (2011) Molenaar M., et al., First Downhole Application of Distributed Acoustic Sensing (DAS) for Hydraulic Fracturing Monitoring and Diagnostics.

SPE-149602 (2012) Johannessen K., et al., Distributed Acoustic Sensing-a new way of listening to your well/reservoir SPE-173640-MS—Grayson, S., et al. (2015). Monitoring acid stimulation treatments in naturally fractured reservoirs with slickline distributed temperature sensing.

SPE-179149-MS—Wheaton, B., et al. (2016). A case study of completion effectiveness in the eagle ford shale using DAS/DTS observations and hydraulic fracture modeling.

SPE-186091-PA—Wu, K., et al. (2017). Mechanism analysis of well interference in unconventional reservoirs: Insights from fracture-geometry simulation between two horizontal wells.

SPE-90541-MS—Ouyang, L.-B., et al. (2006). Flow profiling via distributed temperature sensor (DTS) system-expectation and reality.

URTEC-1581750-MS—Portis, D. H., et al. (2013). Searching for the optimal well spacing in the eagle ford shale: A practical tool-kit.

US20150146759 Temperature sensing using distributed acoustic sensing.

US20170260839 Hydraulic fracture monitoring by low-frequency DAS

US20170260842 Low frequency distributed acoustic sensing

US20170260846 Measuring downhole temperature by combining DAS/DTS data

US20170260849 DAS method of estimating fluid distribution

US20170260854 Hydraulic fracture monitoring by low-frequency DAS.

US20170342814 LOW-FREQUENCY DAS SNR IMPROVEMENT

US2018045040 Production Logs From Distributed Acoustic Sensors (42437).

U.S. Pat. No. 8,505,625 Controlling well operations based on monitored parameters of cement health.

The invention claimed is:

1. A method of evaluating cross-well interference, comprising:
    a) providing a hydraulically fractured monitor well and a hydraulically fractured production well, said monitor well and said production well in a hydrocarbon formation;
    b) providing one or more fiber optic cables along a length of said monitor well, wherein said one or more fiber optic cables are configured for low frequency distributed acoustic sensing ("DAS") of <1 Hz and for distributed temperature sensing ("DTS");
    c) shutting-in both wells until temperature and pressure equilibrates and then recording DAS data and DTS data for at least 2 hours in said monitor well;
    d) opening said production well and producing hydrocarbon for a period of time and continuing recording DAS data and DTS data throughout said period of time;
    e) analyzing said DAS data and said DTS data and determining whether said monitor well has interference with said production well based on temperature fluctuations detected in said DAS data; and
    f) identifying one or more locations where interference is occurring based on locations where said temperature fluctuations are detected.

2. The method of claim 1, wherein DAS data is downsampled to <1 Hz.

3. The method of claim 1, wherein pressure is varied during said opening step.

4. The method of claim 1, further comprising measuring pressure in said monitor well and said production well during said opening step d or throughout said method.

5. The method of claim 1, wherein said interference and said location are confirmed by switching the identity of said monitor well and said production well and repeating said method.

6. The method of claim 1, wherein said one or more fiber optic cables are cemented in behind a casing in said monitor well.

7. The method of claim 1, wherein said one or more fiber optic cables are cemented in behind a casing in said monitor well and said method further comprising correcting for a delay in temperature change as it propagates through said case and said cement to said one or more fiber optic cables.

8. The method of claim 1, wherein said one or more fiber optic cables are deployed into said monitor well via wireline, coil tubing, or carbon rod.

9. The method of claim 1, wherein said period of time is 1-5 hours.

10. The method of claim 1, wherein said method further includes estimating cross flow velocity of said interference by comparing the DAS data with co-located temperature gauge or DTS data.

11. A method of optimizing hydrocarbon production from a reservoir, comprising:
    a) providing a hydraulically fractured monitor well and a hydraulically fractured production well in a reservoir, said monitor well and said production well having potential interference;
    b) providing one or more fiber optic cables along a length of said monitor well, wherein said one or more fiber optic cables are configured for low frequency distributed acoustic sensing ("DAS") of <0.1 Hz and for distributed temperature sensing ("DTS"), and providing a borehole pressure gauge and one or more bottom hole pressure sensors in said monitor well for measuring pressure;
    c) shutting-in both wells for about 12 hours or more and then recording DAS data and DTS data and pressure data for at least 2 hours in said monitor well;
    d) variably opening said production well to vary pressure over a period of time and continuing recording DAS data and DTS data and pressure data throughout said period of time;
    e) analyzing said DAS data and said DTS data and said pressure data;
    f) determining whether said monitor well has interference with said production well based on temperature fluctuations detected in said DAS data and fluctuations in said pressure data and determining a location along said length where said interference is occurring based on temperature fluctuations detected in said DAS data; and
    g) optimizing a hydrocarbon production plan based on said determined interference and said determined location.

12. The method of claim 11, wherein said interference and said location are confirmed by switching the identity of said monitor well and said production well and repeating said method.

13. The method of claim 11, wherein said one or more fiber optic cables are cemented in behind a casing in said monitor well and further comprising correcting for a delay in temperature change as it propagates through said case and said cement to said one or more fiber optic cables.

14. The method of claim 12, wherein said one or more fiber optic cables are deployed into said monitor well via wireline, coil tubing, or carbon rod.

15. The method of claim 11, wherein said period of time is 1-5 hours.

16. The method of claim 11, wherein said method further includes estimating cross flow velocity of said interference by comparing the DAS data with co-located temperature gauge or DTS data.

17. The method of claim 11, wherein said method further includes estimating cross flow velocity of said interference by comparing the DAS data with co-located temperature gauge or DTS data.

18. The method of claim 12, wherein said method further includes estimating cross flow velocity of said interference by comparing the DAS data with co-located temperature gauge or DTS data.

19. The method of claim 13, wherein said method further includes estimating cross flow velocity of said interference by comparing the DAS data with co-located temperature gauge or DTS data.

* * * * *